(12) United States Patent
Kikui

(10) Patent No.: US 12,206,982 B2
(45) Date of Patent: Jan. 21, 2025

(54) INFORMATION PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Kosuke Kikui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 18/189,436

(22) Filed: Mar. 24, 2023

(65) Prior Publication Data

US 2023/0345117 A1 Oct. 26, 2023

(30) Foreign Application Priority Data

Apr. 25, 2022 (JP) .................. 2022-071836

(51) Int. Cl.
  *H04N 23/66* (2023.01)
(52) U.S. Cl.
  CPC .................. *H04N 23/66* (2023.01)
(58) Field of Classification Search
  CPC .............. H04N 23/66; H04N 23/661
  See application file for complete search history.

(56) References Cited

U.S. PATENT DOCUMENTS

| 10,944,893 B1* | 3/2021 | Daulton | G06F 1/1632 |
| 2014/0176736 A1* | 6/2014 | Sato | H04W 84/12 |
| | | | 348/207.11 |
| 2017/0214842 A1* | 7/2017 | Carr | H04N 23/90 |
| 2017/0289427 A1* | 10/2017 | Eum | H04N 23/661 |
| 2019/0053304 A1* | 2/2019 | Ikeda | H04W 8/005 |
| 2019/0191074 A1* | 6/2019 | Ikeda | H04N 23/65 |
| 2019/0199907 A1* | 6/2019 | Daulton | H04N 23/631 |
| 2020/0152031 A1* | 5/2020 | Takahashi | H04N 7/188 |
| 2020/0228664 A1* | 7/2020 | Tomidokoro | G03B 17/02 |

FOREIGN PATENT DOCUMENTS

JP 2012-029056 A 2/2012

* cited by examiner

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

This invention provides an information processing apparatus comprising a first acquisition unit which acquires first operation member arrangement information related to an arrangement of an operation member of a first electronic device having an operation member to which a user-set function is assignable, and first setting value information representing a relation between the operation member and the user-set function, a second acquisition unit which acquires second operation member arrangement information related to an arrangement of an operation member of a second electronic device, a conversion unit which converts the first setting value information into second setting value information for the second electronic device, based on the first and second operation member arrangement information, and a transmission unit which transmits the second setting value information to the second electronic device.

9 Claims, 12 Drawing Sheets

F I G. 1
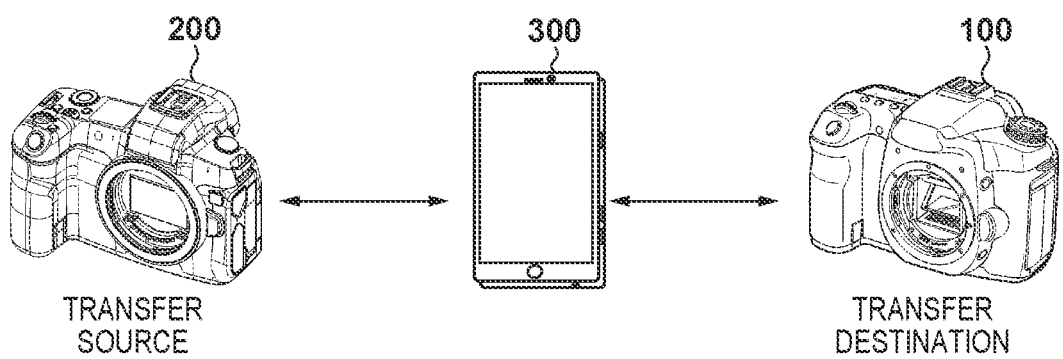

FIG. 5A

OPERATION MEMBER ARRANGEMENT INFORMATION OF TRANSFER SOURCE CAMERA

| POSITION OF OPERATION MEMBER | OPERATION MEMBER NAME (ID) |
|---|---|
| BACK SIDE,90°(AF-ON),0.7cm | AE LOCK |
| BACK SIDE,170°(AF-ON),3.8cm | SET |
| BACK SIDE,190°(AF-ON),4.0cm | PLAYBACK |
| BACK SIDE,210°(AF-ON),2.2cm | INFO |
| ⋮ | ⋮ |

FIG. 5B

OPERATION MEMBER ARRANGEMENT INFORMATION OF TRANSFER DESTINATION CAMERA

| POSITION OF OPERATION MEMBER | OPERATION MEMBER NAME (ID) |
|---|---|
| BACK SIDE,80°(AF-ON),0.7cm | AE LOCK |
| BACK SIDE,180°(AF-ON),3.5cm | SET |
| BACK SIDE,185°(AF-ON),4.2cm | PLAYBACK |
| BACK SIDE,210°(AF-ON),2.4cm | ENLARGE |
| BACK SIDE,240°(AF-ON),1.8cm | INFO |
| ⋮ | ⋮ |

FIG. 6A

SETTING VALUE INFORMATION OF TRANSFER SOURCE CAMERA

| OPERATION MEMBER NAME (ID) | ASSIGNED SETTING VALUE |
|---|---|
| AE LOCK | AE LOCK/FE LOCK |
| SET | FOCUS MODE |
| PLAYBACK | PROTECT |
| INFO | CHANGE DISPLAY INFORMATION |
| ⋮ | ⋮ |

FIG. 6B

SETTING VALUE INFORMATION OF TRANSFER DESTINATION CAMERA

| OPERATION MEMBER NAME (ID) | ASSIGNED SETTING VALUE |
|---|---|
| AE LOCK | AE LOCK/FE LOCK |
| SET | FOCUS MODE |
| PLAYBACK | PROTECT |
| ENLARGE | CHANGE DISPLAY INFORMATION |
| ⋮ | ⋮ |

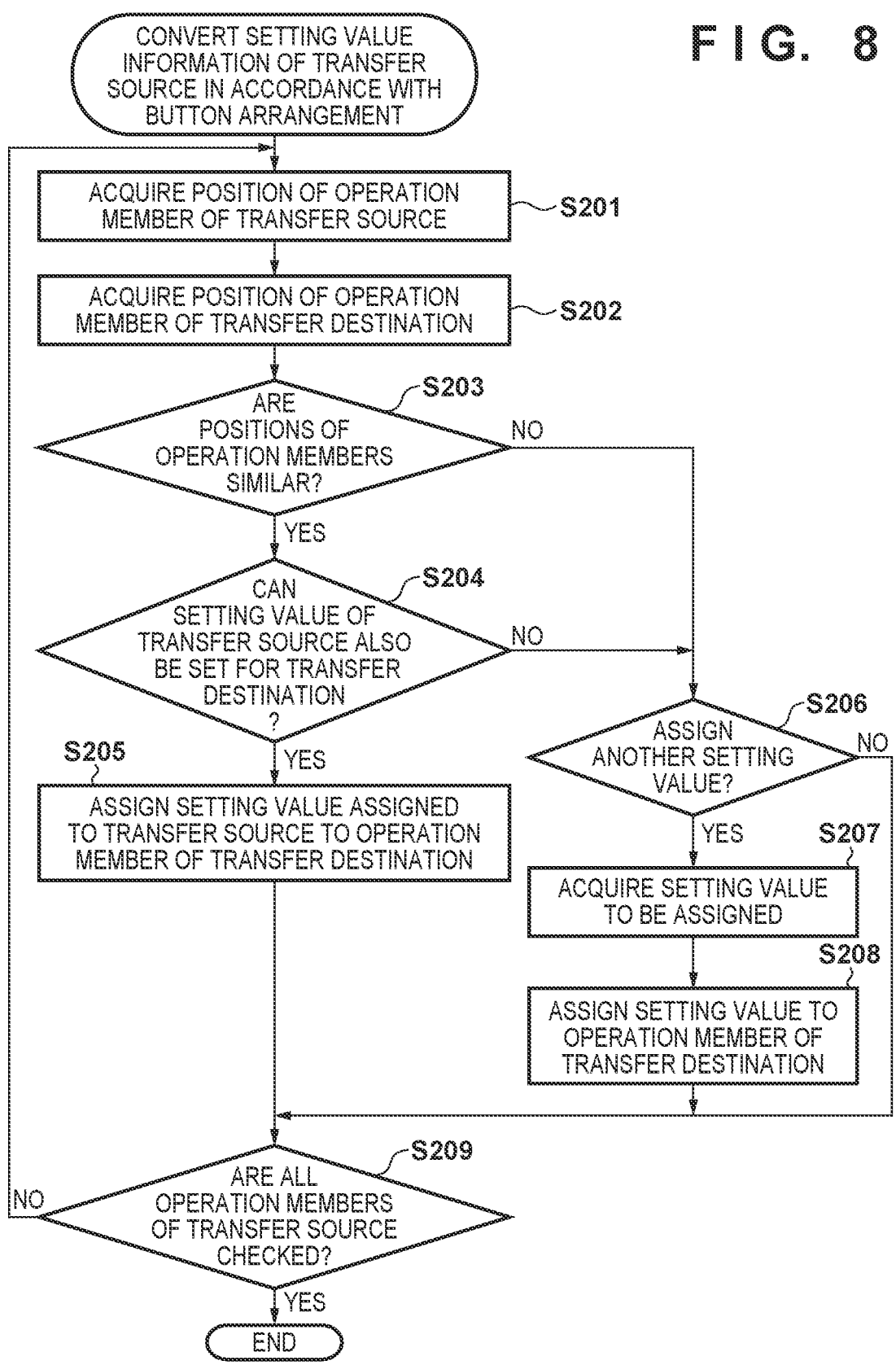

FIG. 10
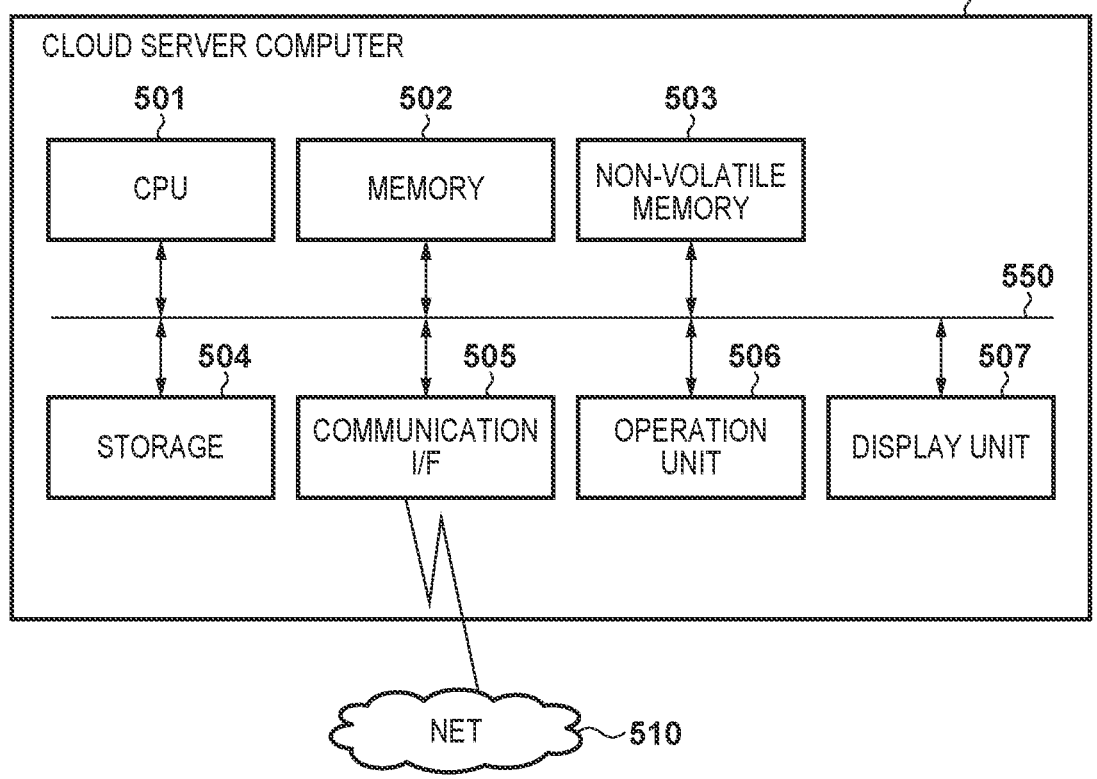
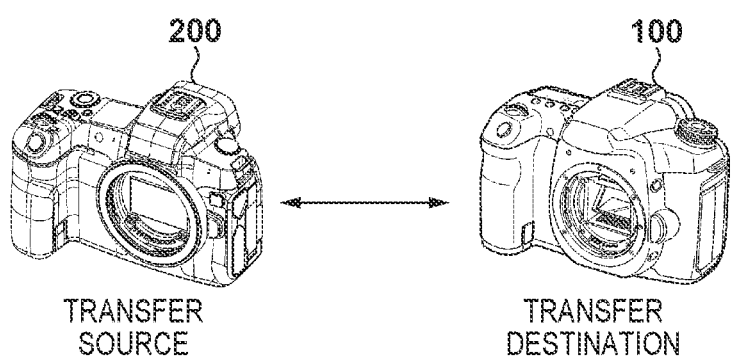
FIG. 11

INFORMATION PROCESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an information processing apparatus, a control method thereof, and a non-transitory computer-readable storage medium.

Description of the Related Art

Recent image capturing apparatuses typified by digital cameras allow a user to assign functions of choice to operation members such as buttons or dials installed thereon. Japanese Patent Laid-Open No. 2012-29056 discloses such a technique.

However, users who own a plurality of digital cameras need to perform an operation of assigning functions of choice to the operation members for each digital camera, which takes time and effort. Since button names, types, amounts, arrangement locations, shapes, and the like differ for each type of digital camera, merely transferring setting information possibly impairs usability.

SUMMARY OF THE INVENTION

According to an aspect of the invention, there is provided an information processing apparatus, comprising: a first acquisition unit configured to acquire first operation member arrangement information related to an arrangement of an operation member of a first electronic device having an operation member to which a user-set function is assignable, and first setting value information representing a relation between the operation member and the user-set function; a second acquisition unit configured to acquire second operation member arrangement information related to an arrangement of an operation member of a second electronic device of a different type than the first electronic device; a conversion unit configured to convert the first setting value information acquired by the first acquisition unit into second setting value information for the second electronic device, based on the first operation member arrangement information acquired by the first acquisition unit and the second operation member arrangement information acquired by the second acquisition unit; and a transmission unit configured to transmit the second setting value information acquired through the conversion performed by the conversion unit to the second electronic device.

The present invention makes it possible to transfer an operation environment of a first electronic device having an operation member to which a user-set function is assignable, to a second electronic device in accordance with an arrangement position of the operation member.

Further features of the present invention will become apparent from the following description of exemplary embodiments with reference to the attached drawings.

BRIEF DESCRIPTION OF THE DRAWINGS

FIG. 1 is a system configuration diagram according to a first embodiment.

FIGS. 5A and 5B each illustrate an example of operation member arrangement information according to the first embodiment.

FIGS. 6A and 6B each illustrate an example of user setting value information according to the first embodiment.

FIG. 8 is a flowchart illustrating a processing procedure related to converting the user setting value information.

FIG. 10 is a block diagram of a cloud server computer according to the second embodiment.

FIG. 11 is a system configuration diagram according to a third embodiment.

DESCRIPTION OF THE EMBODIMENTS

Figure 2:
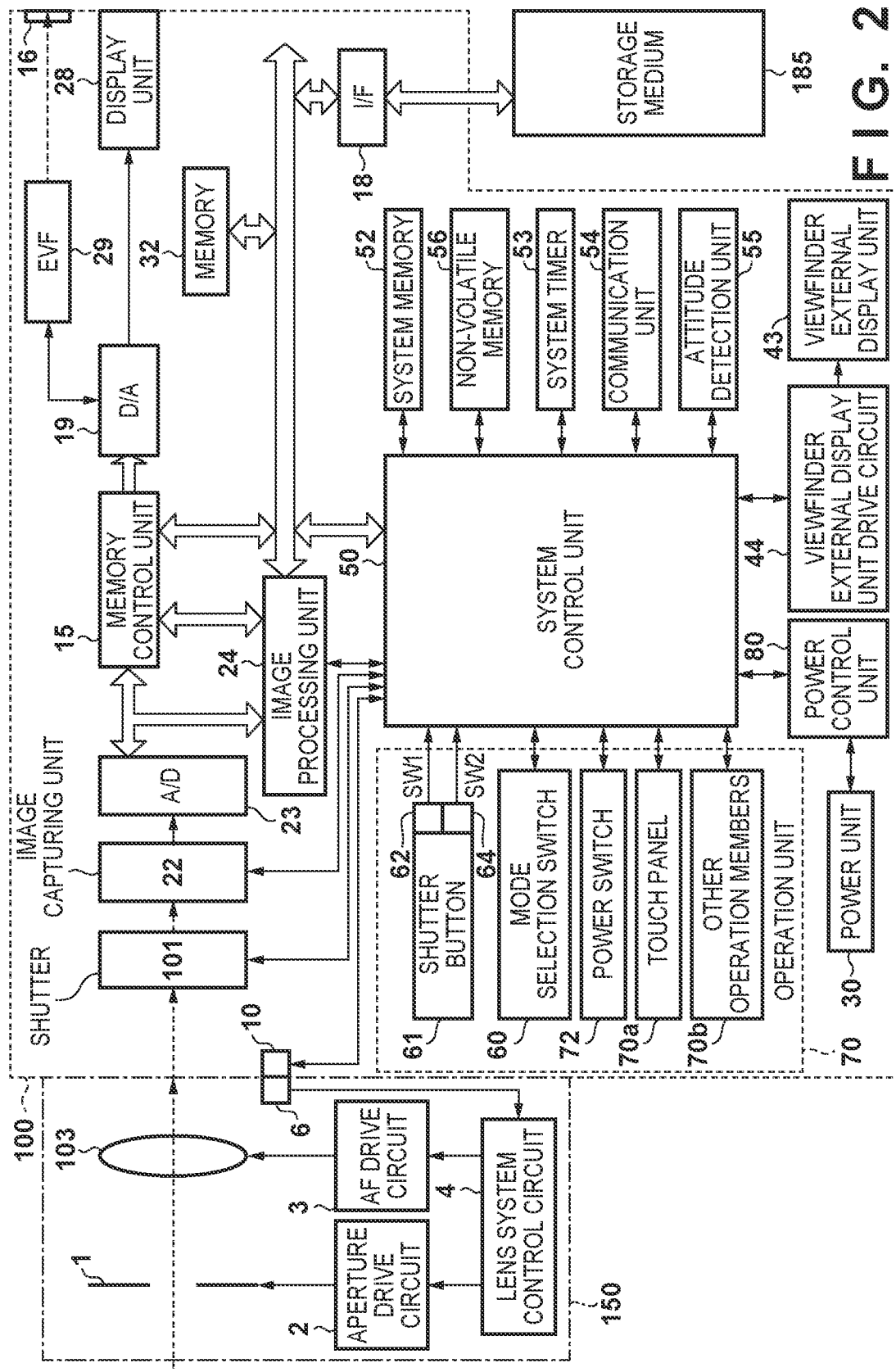
FIG. 2 is a block diagram of components of a camera according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a system configuration diagram according to a first embodiment. As illustrated, the system includes cameras 100 and 200, and a smartphone 300.

The cameras 100 and 200 have switches and buttons (hereinafter referred to as "custom operation members") to which a user can freely assign functions. It is assumed that the user has already completed assignment to the custom operation members of the camera 200, but has not completed assignment to the custom operation members of the camera 100. In the embodiment, an example will be described in which information set up for the camera 200 is also set up for the camera 100 via the smartphone 300. The camera 200 may therefore also be referred to as a transfer source and the camera 100 as a transfer destination.

The transfer source camera 200 and the transfer destination camera 100 are both communicably connected to the smartphone 300. The connection may be either a wired connection using a USB, a LAN cable, and the like; or a wireless connection using Wi-Fi, Bluetooth (registered trademark), and the like. Any communication protocol such as PTP or HTTP may also be used.

FIG. 2 is a block diagram illustrating a configuration example of the camera 100 which is an image capturing apparatus according to the present embodiment, and a lens unit 150 having an exchangeable image capturing lens installed therein.

Although a lens 103 normally includes a plurality of lenses, only one lens is illustrated in FIG. 2 for simplicity purposes. A communication terminal 6 is a communication terminal through which the lens unit 150 communicates with the camera 100, and a communication terminal 10 is a communication terminal through which the camera 100 communicates with the lens unit 150. The lens unit 150 communicates with a system control unit 50 via the communication terminals 6 and 10. The lens unit 150 controls an aperture 1 via an aperture drive circuit 2 through an internal lens system control circuit 4. The lens unit 150 focuses the camera 100 by varying a position of the lens 103 via an AF drive circuit through the lens system control circuit 4.

A shutter 101 is a focal plane shutter that can freely control an exposure time of an image capturing unit 22 through control by the system control unit 50.

The image capturing unit 22 is an image capturing element (image sensor) including a CCD, a CMOS element or the like that converts an optical image into an electric signal. The image capturing unit 22 may include an on-imaging plane phase difference sensor that outputs defocus amount information to the system control unit 50. An A/D converter 23 converts an analog signal output from the image capturing unit 22 into a digital signal.

An image processing unit 24 performs predetermined processing (pixel interpolation, resizing processing such as shrinking, color conversion processing, or the like) on image data output from the A/D converter 23 or image data from a memory control unit 15. The image processing unit 24 performs predetermined calculation processing using captured image data, and the system control unit 50 performs exposure control or distance measurement control based on a calculation result acquired by the image processing unit 24. Accordingly, processing such as through-the-lens (TTL) autofocus (AF) processing, automatic exposure (AE) processing, or pre-flash processing. The image processing unit 24 further performs predetermined calculation processing using the captured image data, and performs TTL automatic white balance (AWB) processing based on the acquired calculation result.

The output data (image data) from the A/D converter 23 is written to a memory 32 via the image processing unit 24 and the memory control unit 15. Alternatively, the output data from the A/D converter 23 is written to the memory 32 via the memory control unit 15 without involvement of the image processing unit 24.

The memory 32 stores image data captured by the image capturing unit 22 and converted into digital data by the A/D converter 23, image data to be displayed on a display unit 28 or an Electronic View Finder (EVF) 29, or the like. The memory 32 has sufficient storage capacity for storing a predetermined number of still images, a moving image and sound of a predetermined duration. The memory 32 also serves as a memory (video memory) for image display.

A D/A converter 19 converts data for image display stored in the memory 32 into an analog signal and supplies the analog signal to the display unit 28 or the EVF 29. As such, the image data for display written to the memory 32 is displayed by the display unit 28, the EVF 29, or the like via the D/A converter 19. The display unit 28 and the EVF 29 are each an LCD, an organic EL display, or the like, and perform display in accordance with the analog signal from the D/A converter 19. Live view (LV) display can be performed by converting a digital signal, which has been converted by the A/D converter 23 and stored in the memory 32, into an analog signal by the D/A converter 19, and subsequently transferring the analog signal to the display unit 28 or the EVF 29. Hereinafter, an image to be displayed through live view display will be referred to as a live view image (LV image).

The system control unit 50 includes at least one processor and/or at least one circuit, and controls an entirety of the camera 100. The system control unit 50 may also be a processor or a circuit. The system control unit 50 performs each process of the present embodiment described below by executing a program stored in a non-volatile memory 56. The system control unit 50 also performs display control by controlling the memory 32, the D/A converter 19, the display unit 28, the EVF 29, and the like.

A system memory 52 is, for example, a RAM. The system control unit 50 deploys, in the system memory 52, various constants and variables to be used for processing, programs read from the non-volatile memory 56, and the like.

The non-volatile memory 56, which is an electrically erasable and writable memory, may be, for example, an EEPROM. The non-volatile memory 56 stores constants, programs, operation member arrangement information, and the like for operating the system control unit 50. The programs mentioned here refer to programs for executing various flowcharts described below in the present embodiment. The camera 100 (and also the camera 200) according to the embodiment can assign functions of the user's choice to operation members such as one or more buttons or switches included in the operation unit. It is therefore assumed that operation member arrangement position information, which indicates arrangement positions of operation members to which such functions can be assigned, is held by the non-volatile memory 56. User setting value information, which indicates a correspondence relation between the operation members to which functions can be assigned and the functions actually assigned thereto, is also held by the non-volatile memory 56.

A system timer 53 is a clocking unit that measures the time used for various controls and the time of a built-in clock.

A communication unit 54 transmits and receives various types of data such as video signals, audio signals, or commands to and from an external device connected wirelessly or via a wired cable. The communication unit 54 can also be connected to a wireless local area network (LAN) or the Internet. The communication unit 54, which includes a Bluetooth-based or Bluetooth-Low-Energy-based communication unit, can also communicate with an external device using such a communication unit. The communication unit 54, which can transmit an image (including an LV image) captured by the image capturing unit 22, an image stored in a storage medium 185, or the like, can receive image data or other various types of information from the external device.

An attitude detection unit 55 detects an attitude of the camera 100 with respect to the direction of gravity. The system control unit 50 can determine, based on the attitude detected by the attitude detection unit 55, whether an image captured by the image capturing unit 22 is a landscape image (image captured by the camera 100 held horizontally) or a portrait image (image captured with the camera held vertically). The system control unit 50 can therefore add orientation information corresponding to the attitude detected by the attitude detection unit 55 to an image file of the image captured by the image capturing unit 22, store the image in a rotated manner, or the like. An acceleration sensor, a gyro sensor, or the like can be used as the attitude detection unit 55. It is also possible to detect a motion of the camera 100 (whether the camera 100 is panned, tilted, lifted, still, etc.)

using the acceleration sensor, the gyro sensor, or the like serving as the attitude detection unit 55.

A viewfinder external display unit 43 displays various setting values of the camera, such as shutter speed or aperture, via a viewfinder external display unit drive circuit 44.

A power control unit 80 includes a battery detecting circuit, a DC-DC converter, a switching circuit that switches between blocks to be powered, and the like. The power supply control unit 80 detects whether a battery is inserted, battery type, remaining battery level, and the like. The power control unit 80 controls the DC-DC converter based on the result of the aforementioned detection and an instruction from the system control unit 50; and supplies each unit including the storage medium 185 with a required voltage for a required period. A power unit 30 includes a primary battery such as an alkaline battery or a lithium battery; a secondary battery such as a NiCd battery, a NiMH battery, or an Li battery; an AC adapter; and the like.

A storage medium I/F 18 provides an interface with the storage medium 185 being a memory card, a hard disk, or the like. The storage medium 185, which is a memory card or the like for storing captured images, includes a semiconductor memory, a magnetic disk or the like.

An operation unit 70, which is an input unit that accepts operations from the user (user operation), is used for inputting various operation instructions to the system control unit 50. As illustrated in FIG. 2, the operation unit 70 includes a shutter button 61, a mode selection switch 60, a power switch 72, a touch panel 70a, and other operation members 70b. The other operation members 70b include a main electronic dial 71, a sub-electronic dial 73, a four-direction key 74, a SET button 75, a video button 76, an AE lock button 77, an enlarge button 78, a playback button 79, a menu button 81, and the like.

The shutter button 61 includes a first shutter switch 62 and a second shutter switch 64. The first shutter switch 62 is turned ON by operating the shutter button 61 midway, or half-pressing the shutter button 61 (image capturing preparation instruction) to generate a first shutter switch signal SW1. Upon receiving the first shutter switch signal SW1, the system control unit 50 starts an image capturing preparation operation, such as autofocus (AF) processing, automatic exposure (AE) processing, automatic while balance (AWB) processing, or pre-flash processing (EF).

The second shutter switch 64 is turned ON by finishing operating the shutter button 61, or fully pressing the shutter button 61 (image capturing instruction) to generate a second shutter switch signal SW2. Upon receiving the second shutter switch signal SW2, the system control unit 50 starts a series of image capturing processing operations from reading a signal from the image capturing unit 22 to writing an image to the storage medium 185 as an image file.

The mode selection switch 60 switches the operation mode of the system control unit 50 to one of a still image capturing mode, a video capturing mode, a playback mode, or the like. The modes included in the still image capturing mode are an automatic image capturing mode, an automatic scene recognition mode, a manual mode, an aperture priority mode (Av mode), a shutter speed priority mode (Tv mode), a program AE mode (P mode), and the like. There are various scene modes, custom modes, and the like, which are image capturing settings for each image capturing scene. The mode selection switch 60 allows the user to directly switch to any of the aforementioned modes. Alternatively, after temporarily switching to a screen listing the image capturing modes with the mode selection switch 60, it is also possible to selectively switch to any one of the plurality of modes being displayed using another operation member. Similarly, the video capturing mode may also include a plurality of modes.

The touch panel 70a is a touch sensor that detects various touch operations on a display surface (operation surface of the touch panel 70a) of the display unit 28. The touch panel 70a and the display unit 28 can be integrally configured. For example, the touch panel 70a has a light transmittance that does not hinder display on the display unit 28, and is attached to an upper layer of the display surface of the display unit 28. Input coordinates on the touch panel 70a are associated with display coordinates on the display surface of the display unit 28. Accordingly, it is possible to provide a graphical user interface (GUI) that gives the user the impression of directly operating the screen displayed on the display unit 28.

The camera 100 has been described above, but a circuit configuration of the camera 200 is the same as illustrated in FIG. 2, and description thereof will be omitted.

Figure 3:
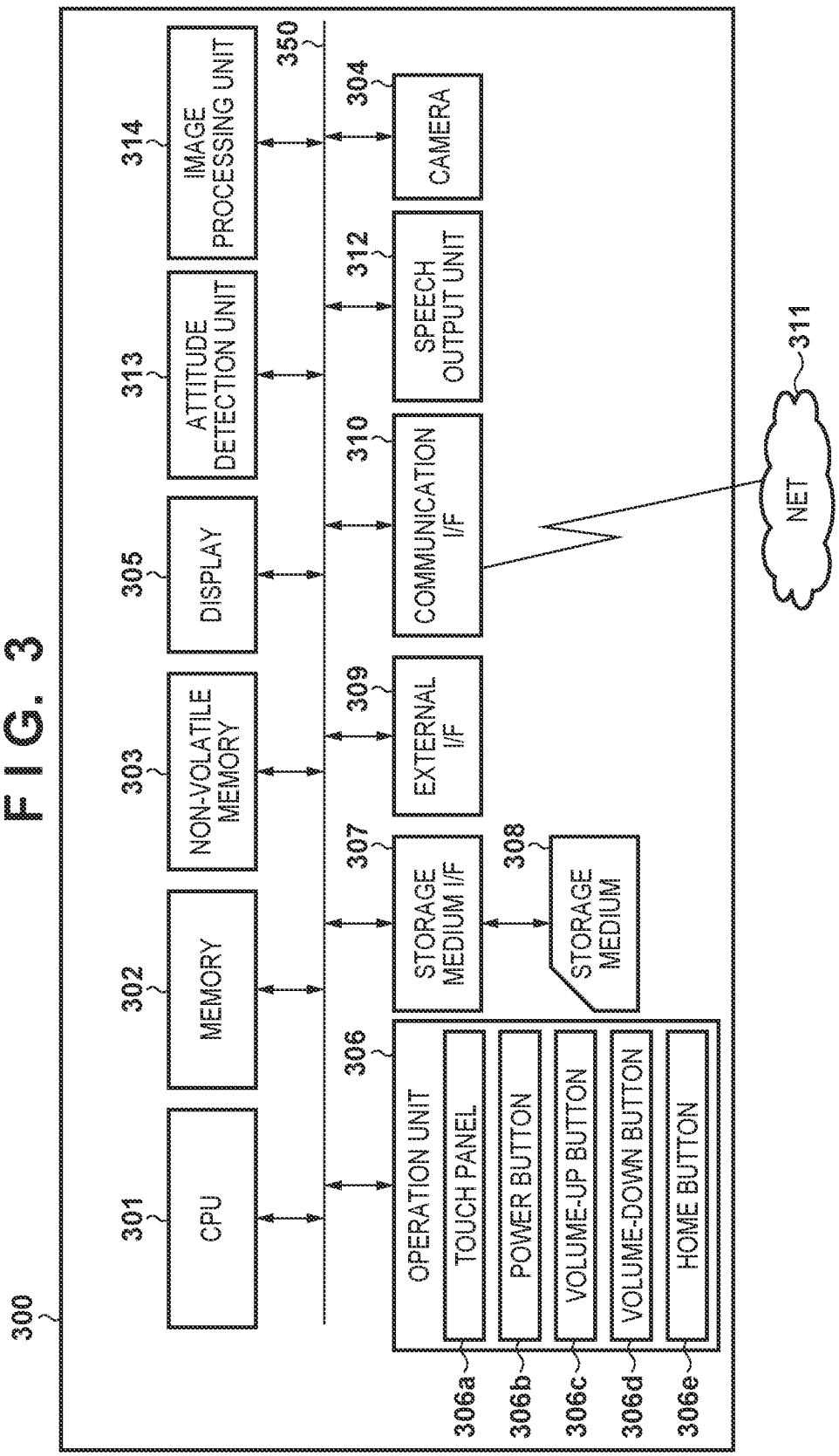
FIG. 3 illustrates a configuration of an information processing apparatus according to the first embodiment.

FIG. 3 is a block diagram of a configuration of the smartphone 300 being an information processing apparatus according to the present embodiment. An internal bus 350 includes connected thereto a CPU 301, a memory 302, a non-volatile memory 303, a camera 304, a display 305, an operation unit 306, a storage medium I/F 307, a storage medium 308, an external I/F 309, and a communication I/F 310. The internal bus 350 also has connected thereto a speech output unit 312, an attitude detection unit 313, and a camera image processing unit 314. The units connected to the internal bus 350 are configured to be able to exchange data with one another via the internal bus 350.

The CPU 301, which is a control unit that controls an entirety of the smartphone 300, includes at least one processor or circuit. The memory 302 includes, for example, a RAM (such as a volatile memory using a semiconductor element). The CPU 301 controls each unit of the smartphone 300 using, for example, the memory 302 as a work memory in accordance with a program stored in the non-volatile memory 303. The non-volatile memory 303 stores image data, speech data, other data, various programs for operating the CPU 301, and the like. The non-volatile memory 303 includes, for example, a flash memory or a ROM.

The image processing unit 314 performs, based on control by the CPU 301, various image processing and subject recognition processing on images captured by the camera 304. The image processing unit 314 can also perform various image processing on images stored in the non-volatile memory 303 or the storage medium 308, video signals acquired via the external I/F 309, images acquired via the communication I/F 310, and the like.

The display 305 displays an image, a GUI screen forming the GUI, or the like based on control by the CPU 301. The CPU 301 generates a display control signal in accordance with a program, and controls each unit of the smartphone 300 to output a video signal to the display 305. The display 305 displays a video based on the video signal output thereto. Note that the components included in the smartphone 300 itself may include the interface for outputting video signals to be displayed on the display 305, with the display 305 being provided as an external monitor (television).

The operation unit 306 is an input device for accepting user's operations, including a character information input device such as a keyboard, a pointing device such as a mouse or a touch panel, a button, a dial, a joystick, a touch sensor, or a touch pad. Note that the touch panel is a flat input device overlaid on the display 305 so as to output coordinate information in accordance with a touched position. The operation unit 306 includes a touch panel 306a, a power button 306b, a volume-up button 306c, a volume-down button 306d, a home button 306e, and the like.

The storage medium I/F 307, to which the storage medium 308 such as a memory card, CD, or DVD can be attached, reads data from the attached storage medium 308, writes data to the storage medium 308, or the like based on control by the CPU 301. The storage medium 308 may be a built-in storage embedded in the smartphone 300. The external I/F 309 is an interface that provides a connection to an external device via a wired cable or wirelessly to input and output a video signal, an audio signal, or the like. The communication I/F 310 is an interface that communicates with an external device, the Internet 311, or the like to transmit and receive various types of data such as files and commands.

The speech output unit 312 outputs speech data of video, speech during phone calls, operation sound, ringtone, various types of notification sounds, and the like. The attitude detection unit 313 detects the attitude of the smartphone 300 with respect to the direction of gravity and an inclination of the attitude with respect to each of the yaw, roll, and pitch axes. Based on the attitude detected by the attitude detection unit 313, it is possible to determine whether the smartphone 300 is held horizontally or vertically, is oriented upward or downward, or has an oblique attitude. The attitude detection unit 313 can use at least one of an acceleration sensor, a gyro sensor, a geomagnetic sensor, an orientation sensor, an altitude sensor, or a combination of more than one thereof.

The touch panel 306a may be any of a resistive type, capacitance type, surface acoustic wave type, infrared type, electromagnetic induction type, image recognition type, photo sensor type, or the like. Either a method of detecting contact with the touch panel or detecting proximity of a finger or a pen to the touch panel may be employed as a touch detection method.

Figure 4A:
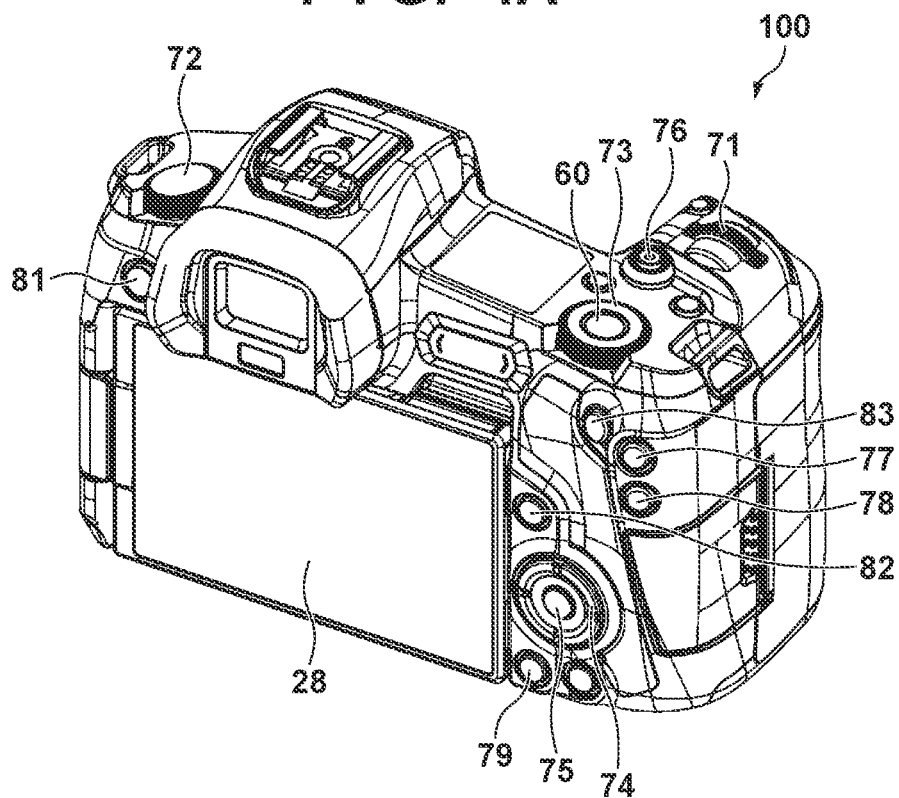
FIGS. 4A and 4B respectively illustrate an arrangement example of operation members of a transfer source camera and a transfer destination camera.
Figure 4B:
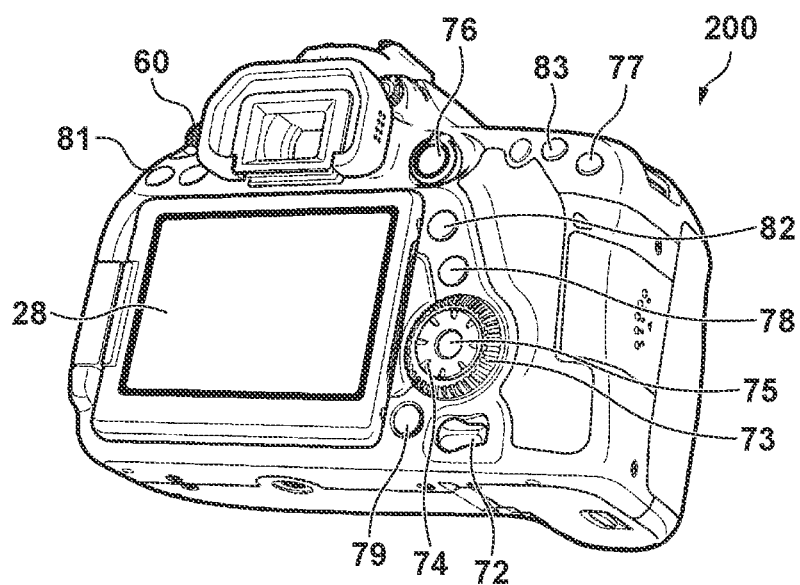

FIGS. 4A and 4B respectively illustrate an arrangement example of the operation members of the cameras 100 and 200. FIG. 4A illustrates the arrangement example of the operation members of the transfer destination camera 100, and FIG. 4B illustrates the layout example of the operation members of the transfer source camera 200. It should be noted that operation members with the same function are provided with the same reference numeral.

The mode selection switch 60 is an operation member for switching between various modes. The main electronic dial 71 is a rotating operation member, which can be rotated to change setting values such as the shutter speed or the aperture.

The power switch 72 is an operation member for switching ON and OFF the power supply to the camera 100.

The sub-electronic dial 73 is a rotation operation member, which can be rotated to move a selection frame (cursor) of a menu item displayed on the display unit 28, forward through images during display of an image, or the like.

The four-direction key 74 is configured to allow for pressing upward, downward, leftward, and rightward parts and performing a processing in response to the pressed part of the four-direction key 74.

The SET button 75 is a push button mainly used for choosing a selected item on a display menu.

The video button 76 is used for instructing to start or stop video capturing (recording).

The AE lock button 77 is a push button that can lock an exposure state when pressed by the user in an image capturing standby state.

The enlarge button 78 is an operation button for switching between ON and OFF of the enlarge mode during live view display (LV display) image capturing mode. Operating the main electronic dial 71 after turning ON the enlarge mode, allows for enlarging or reducing the live view image (LV image). In the playback mode, the enlarge button 78 functions as an operation button for enlarging a playback image or increasing an enlargement ratio.

The playback button 79 is an operation button for switching between the image capturing mode and the playback mode. Pressing the playback button 79 during the image capturing mode causes transition to the playback mode and displays the latest image among the images stored in the storage medium 185 on the display unit 28.

The menu button 81 is a push button used for performing an instruction operation to display a menu screen. Pressing the menu button 81 causes the display unit 28 to display a menu screen that allows for various settings. The user can intuitively perform various settings using the menu screen displayed on the display unit 28, as well as the four-direction key 74, the SET button 75, or the like.

An INFO button 82 is a push button used for switching between information to be displayed on the display unit 28. Pressing the INFO button 82 causes switching between the information displayed on the display unit 28.

An AF-ON button 83 is a push button intended to be pressed by the user in the image capturing standby state to perform AF processing on a subject.

FIGS. 5A and 5B respectively illustrate operation member arrangement information of the transfer source camera 200 and the transfer destination camera 100 in the present embodiment. FIG. 5A illustrates the operation member arrangement information of the transfer source camera 200 (stored in the non-volatile memory 56 of the camera 200), and FIG. 5B illustrates the operation member arrangement information of the transfer destination camera 100 (stored in the non-volatile memory 56 of the camera 100). As illustrated, the operation member arrangement information includes information indicating a position of a corresponding operation member and a name of the corresponding operation member (identification information ID of the operation member).

The operation member arrangement information includes information indicating on which surface each operation member of the camera is provided, and an angle and a distance from a reference operation member on the surface. The information of the position of the operation member is not limited to the aforementioned information, and may be any type of information as long as it is possibly to identify the layout position.

FIGS. 6A and 6B respectively illustrate user setting value information of the transfer source camera 200 and the transfer destination camera 100 according to the present embodiment. FIG. 6A illustrates an example of the user setting value information of the transfer source camera 200, and FIG. 6B illustrates an example of the user setting value information of the transfer destination camera 100 acquired through transfer processing according to the embodiment. The user setting value information includes an operation member name (ID) and a setting value assigned to the operation member. The names of the operation members in FIGS. 6A and 6B are common to those of the operation members in FIGS. 5A and 5B. The setting value indicates information identifying an assigned function.

Figure 7A:
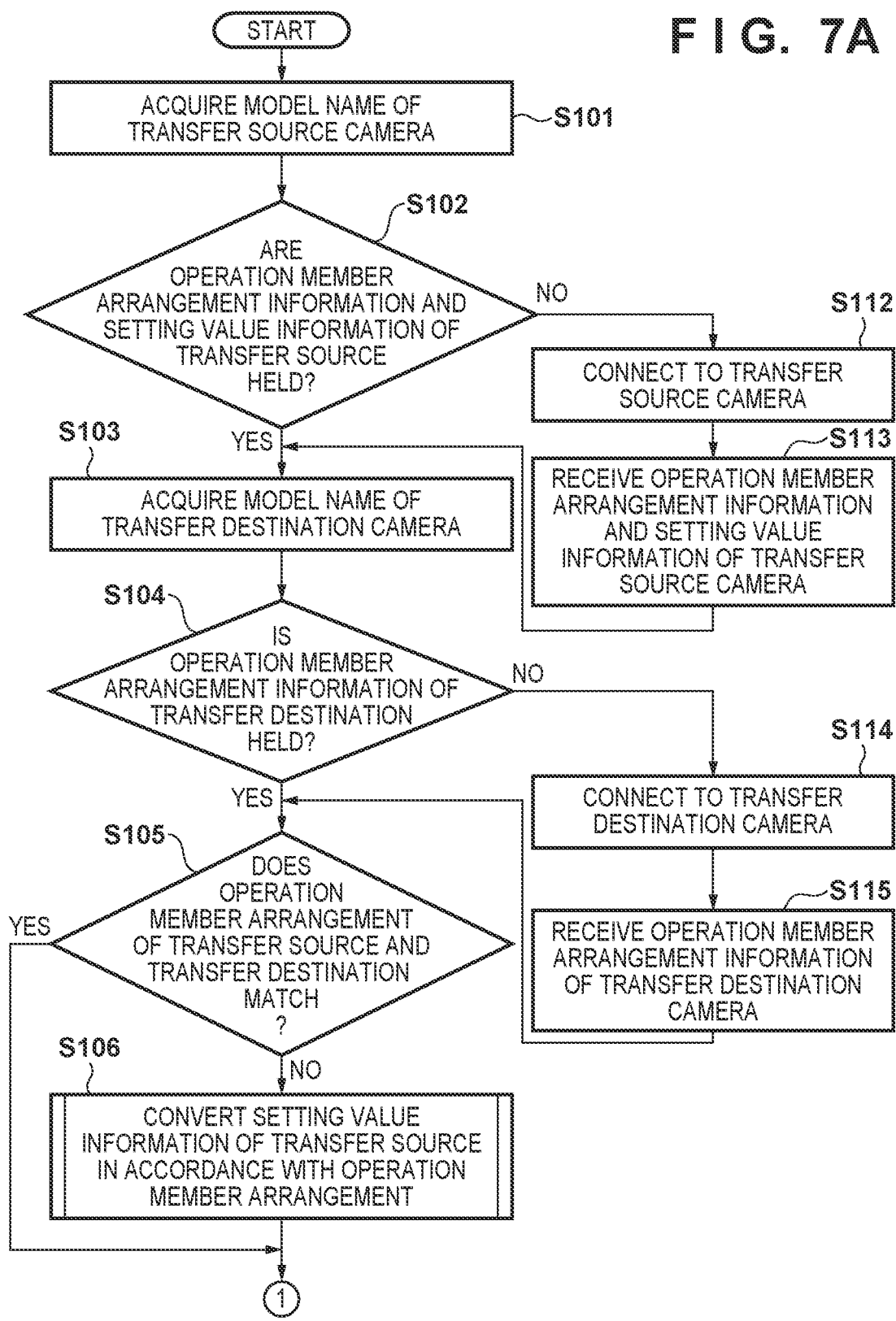
FIGS. 7A and 7B are flowcharts illustrating a processing procedure related to transferring the user setting value information.
Figure 7B:
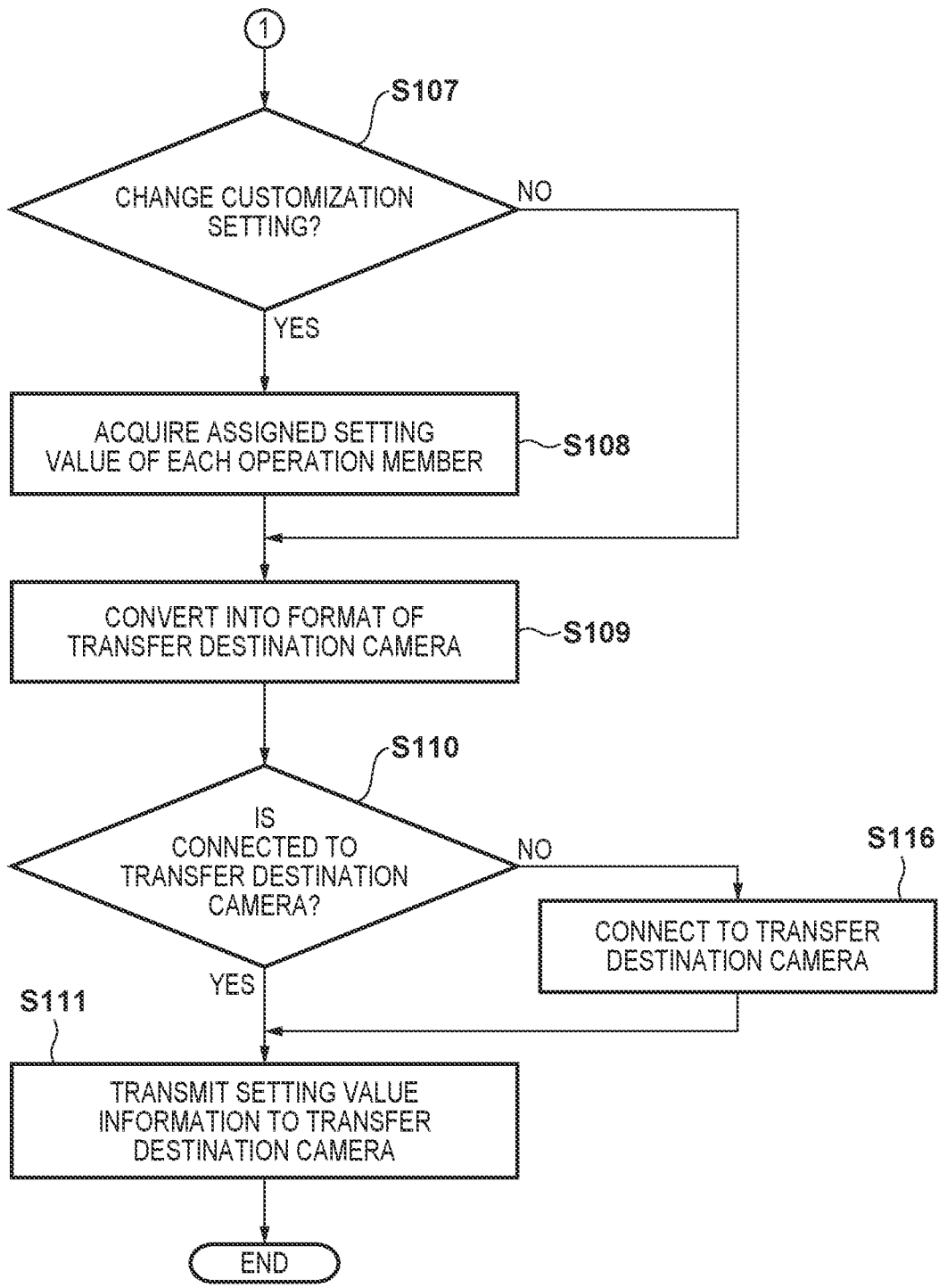

FIGS. 7A, 7B and 8 are flowcharts illustrating a process performed by an application for converting the setting values in the smartphone 300 according to the embodiment. Note that the process is intended to be executed by the CPU 301 when the user operates the smartphone 300 to input an operation instruction for executing the corresponding application.

In S101, the CPU 301 of the smartphone 300 acquires the model name of the transfer source camera 200. The model name may be acquired by accepting an input from the user via the operation unit 306 such as the touch panel 306a, or may be received by connecting to the transfer source camera 200 using the communication I/F 310.

In S102, the CPU 301 determines whether the operation member arrangement information corresponding to the acquired model name and the user setting value information of the transfer source camera 200 are already being held. This is performed through the CPU 301 checking whether the pieces of information are stored in a data holding unit of the smartphone 300 such as the memory 302, the non-volatile memory 303, or the storage medium 308. Upon determining that both the operation member arrangement information and the user setting value information are being held, the CPU 301 advances the process to S103, or to S112 upon determining otherwise.

In S112, the CPU 301 establishes communication between smartphone 300 and the transfer source camera 200. In order to communicate with the camera 200, the smartphone 300 may perform communication using a wired cable via the communication I/F 310, or may perform wireless communication. Upon establishing communication between the smartphone 300 and the camera 200, the CPU 301 advances the process to S113. In S113, the CPU 301 requests, from the transfer source camera 200, the operation member arrangement information and the user setting value information via the communication I/F 310, and receives (acquires) the pieces of information from the transfer source camera 200. Data received at this point may be supplemental operation member arrangement information or user setting value information, and may also be both. The received operation member arrangement information and the user setting value information of the transfer source camera 200 are saved in a data holding unit of the smartphone 300 such as the memory 302, the non-volatile memory 303, or the storage medium 308.

In S103, the CPU 301 acquires the model name of the transfer destination camera 100. The model name may be acquired by accepting an input from the user via the operation unit 306 such as the touch panel 306a, or may be received by connecting to the transfer destination camera 100 using the communication I/F 310.

In S104, the CPU 301 then determines whether the operation member arrangement information of the transfer destination camera 100 is already being held. This is performed through the CPU 301 checking whether the pieces of information are stored in a data holding unit of the smartphone 300 such as the memory 302, the non-volatile memory 303, or the storage medium 308. Upon determining that the operation member arrangement information of the transfer destination camera 100 is being held, the CPU 301 advances the process to S105, or to S114 upon determining otherwise.

In S114, the CPU 301 establishes communication between the smartphone 300 and the transfer destination camera 100. In order to communicate with the camera 100, the smartphone 300 may perform communication using a wired cable via the communication I/F 310 or may perform wireless communication. Upon establishing communication, the CPU 301 advances the process to S115. In S115, the CPU 301 requests, from the transfer destination camera 100, the operation member arrangement information via the communication I/F 310 and receives the information. The CPU 301 then saves the received operation member arrangement information in a data holding unit of the smartphone 300 such as the memory 302, the non-volatile memory 303, or the storage medium 308.

As a result of the aforementioned processing, the smartphone 300 holds the operation member arrangement information and the user setting value information of the transfer source camera 200, as well as the operation member arrangement information of the transfer destination camera 100.

In S105, the CPU 301 determines whether the operation member arrangement information of the transfer source camera 200 matches that of the transfer destination camera 100. When the cameras 100 and 200 have a same model name (same model from same manufacturer), the operation member arrangement information of both cameras match, as a matter of course. In this case, the CPU 301 determines to use the user setting value information of the transfer source camera 200 without change as that of the transfer destination camera 100, and advances the process to S107. When, on the other hand, the CPU 301 determines that the operation member arrangement information of the transfer source camera 200 does not match that of the transfer destination camera 100, the CPU 301 advances the process to S106.

In S106, the CPU 301 calls a subroutine for converting the user setting value information of the transfer source camera 200. After execution of the subroutine, the CPU 301 advances the process to S107. The details of the aforementioned subroutine will be described below with reference to FIG. 8, but the CPU 301 performs a process of converting or generating the user setting value information of the transfer source camera 200 into that of the transfer destination camera 100, based on the operation member arrangement information of both the cameras 200 and 100.

In a case where the process proceeds to S107, the user setting value information of the transfer destination camera 100 is temporarily generated. Specifically, when the determination result of S105 is YES (match), the user setting value information of the transfer source camera 200 is used as that of the transfer destination camera 100 without change. When the determination result of S105 is NO (mismatch), the user setting value information of the transfer destination camera 100 ends up being the information acquired through the processing in S106.

In S107 the CPU 301 displays, based on the user setting value information of the transfer destination camera 100, information indicating a correspondence relation between an operation member and an assigned function on the display 305 or the like, inquires whether to correct the information, and waits for an input from the user. The user is expected to operate the operation unit 306 such as the touch panel 306a to select whether or not to correct the information. Subsequently, upon determining that there has been an input from the user instructing correction, the CPU 301 advances the process to S108, or to S109 when there has been an instruction not to perform correction.

In S108, the CPU 301 changes the user setting value information of the transfer destination by acquiring what to correct from the user with respect to the setting value information to be assigned to the operation member.

In S109, the CPU 301 converts the user setting value information of the transfer destination into a data format conforming to the transfer destination camera 100. The conversion is performed when necessary, but need not be performed when the user setting value information generated through the aforementioned process is in a format conforming to the transfer destination camera 100.

In S110, the CPU 301 determines whether the smartphone is in a connected state with the transfer destination camera 100. Upon determining that connection has been established, the CPU 301 advances the process to S111, or to S116 upon determining otherwise.

In S116, the CPU 301 establishes communication with the transfer destination camera 100 similarly to S114.

In S111, the CPU 301 transmits the user setting value information acquired through the aforementioned process to the camera 100 via the communication I/F 310. The system control unit 50 of the camera 100 reflects the user setting value information by storing (overwriting) the received user setting value information in the non-volatile memory 56.

Next, the aforementioned processing of S106 will be described with reference to the flowchart in FIG. 8.

In S201, the CPU 301 acquires an operation member name (operation member ID) stated in the user setting value information of the transfer source camera 200 stored in the data holding unit of the smartphone 300 such as the memory 302, the non-volatile memory 303, or the storage medium 308. The CPU 301 then acquires position information corresponding to the operation member name from the operation member arrangement information of the transfer source camera 200.

In S202, the CPU 301 acquires the same operation member name (operation member ID) and the position information corresponding thereto of the transfer destination camera 100, the operation member name and the position information corresponding thereto being stored in the data holding unit of the smartphone 300 such as the memory 302, the non-volatile memory 303, and the storage medium 308.

In S203, the CPU 301 determines whether the position information of the operation member acquired in S201 and the position information acquired in S202 are identical or similar (strictly speaking, whether the difference (distance) between the positions is smaller than or equal to a threshold value). Note that when corresponding operation members are each provided on a different surface of the cameras (e.g., when one of the corresponding operation members is located on an upper side of the camera 100 and the other on a back side of the camera 200), it is determined that the positions thereof are not similar. When the corresponding operation members are located on the same surface, proximity thereof is determined based on the angle and the distance from the position of a reference member. For example, the position of a member of the transfer source camera 200 is located at a position with a distance r1 and an angle θ1 from the AF-ON button selected as the reference on the back side, and the position of a member of the transfer destination camera 100 is located at a position with a distance r2 and an angle θ2 from the AF-ON button. A distance x of the operation member can then be calculated using the following expression.

$$x = \{r1^2 + r2^2\} - 2 \times r1 \times r2 \times \cos(\theta2 - \theta1)\}^{1/2}$$

When the calculated distance x is smaller than or equal to a predetermined threshold value (when, for example, a relation of x≤Th holds, with Th being the threshold value), x is determined to be identical or similar, otherwise (when x>Th) x is determined to be not similar (far). Note that the magnitude determination is based on comparison with the threshold value, and the exponent "½" in the above expression need therefore not be calculated.

In that case, it is sufficient to adjust the threshold value to a value corresponding to the modified expression. A method of calculating the distance between two operation members is not limited to the method described above, and another calculation expression may be used.

Upon determining in S203 that the position of an operation member of the transfer source camera 200 to be compared is identical or similar to the position of a corresponding operation member of the transfer destination camera 100, the CPU 301 advances the process to S204, or to S206 upon determining otherwise.

In S204, the CPU 301 determines whether the setting value of the transfer source camera 200 can also be set for the transfer destination camera 100. The setting value information that can be set may be read from a storage area such as the memory 302, the non-volatile memory 303, or the storage medium 308, or may be received from the camera as the operation member arrangement information. When the setting value information is also available to the transfer destination camera 100, the process proceeds to S205, or to S206 otherwise.

In S205, the CPU 301 associates a setting value in the user setting value information of the transfer source camera 200 with an operation member of the transfer destination camera 100, and stores information indicating this correspondence relation in the memory 302. As a result, a part of the user setting value information of the transfer destination camera 100 is generated and stored in the memory 302.

In S206, the CPU 301 determines whether to assign another setting value to the transfer destination camera 100. Upon determining to assign another setting value, the CPU 301 advances the process to S207, or to S209 upon determining otherwise.

In S207, the CPU 301 displays the relation between a corresponding operation member of the transfer source camera 200 and the function assigned thereto on the display 305 for reference, and inquires of the user which function to assign to the corresponding operation member of the transfer destination camera 100. Having viewed the display 305, the user operates the operation unit 306 to choose which function to assign to the corresponding operation member of the transfer destination. At this time, the user is expected to select a function from a list of functions that can be assigned.

In S208, the CPU 301 assigns a setting value acquired in S207 to the corresponding operation member of the transfer destination camera 100, and stores information indicating the correspondence relation between the operation member and the assigned function in the memory 302. As a result, a part of the user setting value information of the transfer destination camera 100 is generated and stored in the memory 302.

In S209, the CPU 301 determines whether the transfer process has been completed for all of the operation members of the transfer source camera 200. When the CPU 301 has determined in S209 that the transfer process has been completed for all of the operation members, the memory 302 is expected to have stored the completed user setting value information for the transfer destination camera 100. The processing of the subroutine is therefore terminated in this case. On the other hand, when the CPU 301 determines in S209 that there are operation members remaining to be processed among the operation members of the transfer source camera 200, the CPU 301 returns the process to S201 to perform the transfer process on the other operation members.

As has been described above, the first embodiment allows for reflecting, through a simple operation, a function assigned to an operation member of the transfer source camera to the transfer destination camera. At this time, an identical function is reflected to an operation member at a position similar to that of the operation member of the transfer source, which allows the user to operate the transfer destination camera without any discomfort.

Second Embodiment

Figure 9:
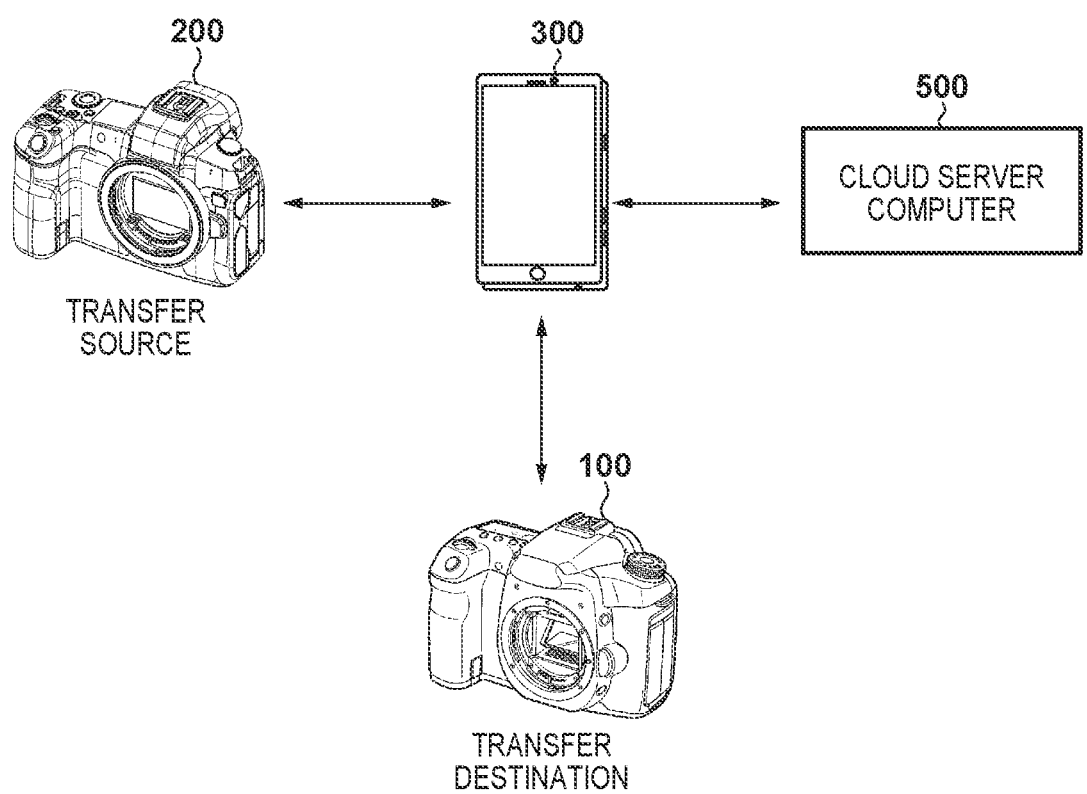
FIG. 9 is a system configuration diagram according to a second embodiment.

A second embodiment will be described below. FIG. 9 is a system configuration diagram according to the second embodiment. As illustrated, the system includes cameras 100 and 200 as image capturing apparatuses, a smartphone 300, and a cloud server computer 500. The transfer source camera 200 and the transfer destination camera 100 are both communicably connected to the smartphone 300. The smartphone 300 is communicably connected to the cloud server computer 500. The connection between the apparatuses may be any type of connection realized using a USB or a wired cable such as a LAN cable, or may be realized using a wireless connection such as Wi-Fi or Bluetooth. Any communication protocol such as PTP or HTTP may also be used. The cameras 100 and 200 may be directly connected to the cloud server computer 500 to communicate with each other, without using the smartphone 300.

FIG. 10 is a block diagram of the cloud server computer 500. An internal bus 550 includes connected thereto a CPU 501, a memory 502, a non-volatile memory 503, a storage 504, a communication I/F 505, an operation unit 506, and a display unit 507. The units connected to the internal bus 550 can exchange data with one other via the internal bus 550.

The CPU 501, which is a control unit that controls an entirety of the cloud server computer 500 includes at least one processor or circuit. The memory 502 includes, for example, a RAM (such as a volatile memory using a semiconductor element). The CPU 501 controls each unit of the cloud server computer 500 using the memory 502 as a work memory, in accordance with a program stored in the non-volatile memory 503, for example. The non-volatile memory 503 stores various programs to operate the CPU 501. The non-volatile memory 503 includes, for example, a flash memory or a ROM.

Storage 504 is a memory card, a hard disk, or the like, but may also be a storage medium such as a CD or a DVD and a drive device thereof. The CPU 501 reads data from the storage 504, writes data to the storage 504, and the like. The storage 504 has stored therein operation member arrangement information or the like for each model typified by the cameras 100 and 200.

The communication I/F 505 is an interface for communicating with an external device or the Internet 510 to transmit and receive various types of data such as files and commands.

The operation unit 506 is an input device for accepting the user's operations, including a character information input device such as a keyboard, a pointing device such as a mouse or a touch panel, a button, a dial, a joystick, a touch sensor, a touch pad, or a power button. Instead of operating the operation unit 506, it is also possible to perform operations through a command received via the communication I/F 505.

The setting value conversion method to be performed by the CPU 501 of the cloud server computer 500 according to the present embodiment can be described in accordance with the flowchart illustrated in FIGS. 7A and 7B. The method will be described below with reference to FIGS. 7A and 7B.

In S101, the CPU 501 of the cloud server computer 500 acquires the model name of the transfer source camera 200. The model name may be acquired by accepting an input from the user via the operation unit 506, or may be relayed through the smartphone 300 and received from the transfer source camera 200.

In S102, the CPU 501 determines whether the operation member arrangement information corresponding to the acquired model name and the user setting value information of the transfer source camera 200 are being held. This is performed through the CPU 501 checking whether the pieces of information are stored in the storage 504. Upon determining that both the operation member arrangement information and the user setting value information are being held, the CPU 501 advances the process to S103, or to S112 upon determining otherwise.

In S112, the CPU 501 establishes communication with the transfer source camera 200 via the communication unit 505, the communication being relayed through the smartphone 300. Upon establishing communication with the camera 200, the CPU 501 advances the process to S113. In S113, the CPU 501 requests, from the transfer source camera 200, the operation member arrangement information and the user setting value information via the communication I/F 505, and receives (acquires) the pieces of information from the transfer source camera 200. Data received at this point may be supplemental operation member arrangement information or user setting value information, and may also be both. The received operation member arrangement information and the user setting value information of the transfer source camera 200 are saved in a data holding unit such as the storage 504.

In S103, the CPU 501 acquires the model name of the transfer destination camera 100. The model name may be acquired by accepting an input from the user via the operation unit 506, or may be relayed through the smartphone 300 and received from the transfer destination camera 100.

The CPU 501 then determines in S104 whether the operation member arrangement information of the transfer destination camera 100 is already being held. This is performed through the CPU 501 checking whether the pieces of information are stored in a data holding unit such as the storage 504. Upon determining that the operation member arrangement information of the transfer destination camera 100 is being held, the CPU 501 advances the process to S105, or to S114 upon determining otherwise.

In S114, the CPU 501 establishes communication with the transfer destination camera 100 via the communication unit 505, the communication being relayed through the smartphone 300. Upon establishing the communication, the CPU 501 advances the process to S115. In S115, the CPU 501 requests, from the transfer destination camera 100, the operation member arrangement information, and receives the information. The CPU 501 then saves the received operation member arrangement information in a data holding unit such as the storage 504.

As a result of the aforementioned processing, the cloud server computer 500 holds the operation member arrangement information and the user setting value information of the transfer source camera 200, as well as the operation member arrangement information of the transfer destination camera 100.

In S105, the CPU 501 determines whether the operation member arrangement information of the transfer source camera 200 matches the operation member arrangement information of the transfer destination camera 100. When the cameras 100 and 200 have a same model name (same model from same manufacturer), the CPU 501 determines to use the user setting value information of the transfer source camera 200 without change, as that of the transfer destination camera 100, and advances the process to S107. When, on the other hand, the CPU 501 determines that the operation member arrangement information of the transfer source camera 200 does not match that of the transfer destination camera 100, the CPU 501 advances the process to S106.

In S106, the CPU 501 calls a subroutine for converting the user setting value information of the transfer source camera 200. After execution of the subroutine, the CPU 501 advances the process to S107. Details of the subroutine are the same as those in the first embodiment (FIG. 8). However, the process illustrated in FIG. 8 according to the second embodiment is intended to be performed by the cloud server computer 500, and the resources to be used are naturally included in the cloud server computer 500. For example, it is assumed in the first embodiment that the user setting value information of the transfer destination camera 100 is constructed in the memory 302 of the smartphone 300. In contrast, the CPU 501 of the cloud server computer 500 is the entity that performs the processing of FIG. 8 in the second embodiment, and therefore the user setting value information of the transfer destination camera 100 is to be generated in the memory 502.

In a case where the process proceeds to S107, the user setting value information of the transfer destination camera 100 is temporarily generated. Specifically, when the determination result of S105 is YES (match), the user setting value information of the transfer source camera 200 is used as that of the transfer destination camera 100 without change. When the determination result of S105 is NO (mismatch), the user setting value information of the transfer destination camera 100 ends up being the information acquired through the processing in S106.

In S107 the CPU 501 displays, based on the user setting value information of the transfer destination camera 100, information indicating a correspondence relation between an operation member and an assigned function on the display unit 507 or the like, inquires whether to correct the information, and waits for an input from the user. The user is expected to operate the operation unit 506, for example, and select whether or not to perform correction. Subsequently, upon determining that there has been an input from the user instructing correction, the CPU 501 advances the process to S108, or to S109 when there has been an instruction not to perform correction.

In S108, the CPU 501 changes the user setting value information of the transfer destination by acquiring from the user what to correct with respect to the setting value information to be assigned to the operation member.

In S109, the CPU 501 converts the user setting value information of the transfer destination into a data format conforming to the transfer destination camera 100. The conversion is performed when necessary, but need not be performed when the user setting value information generated through the aforementioned process is in a format conforming to the transfer destination camera 100.

In S110, the CPU 501 determines whether the cloud server computer 500 has been connected to the transfer destination camera 100. Upon determining that connection has been established, the CPU 501 advances the process to S111, or to S116 upon determining otherwise.

In S116, the CPU 501 establishes communication with the transfer destination camera 100, similar to S114.

In S111, the CPU 501 transmits the user setting value information acquired by the aforementioned processing to the camera 100 to reflect the user setting value information, the information being relayed through the smartphone 300.

Third Embodiment

A third embodiment of the present invention will be described. FIG. 11 is a system configuration diagram according to the third embodiment. The system includes a transfer source camera 200 and a transfer destination camera 100. The connection between the cameras 100 and 200 may be realized using a USB or a wired cable such as a LAN cable, or may be realized using a wireless connection such as Wi-Fi or Bluetooth. Any communication protocol such as PTP or HTTP may also be used.

Figure 12:
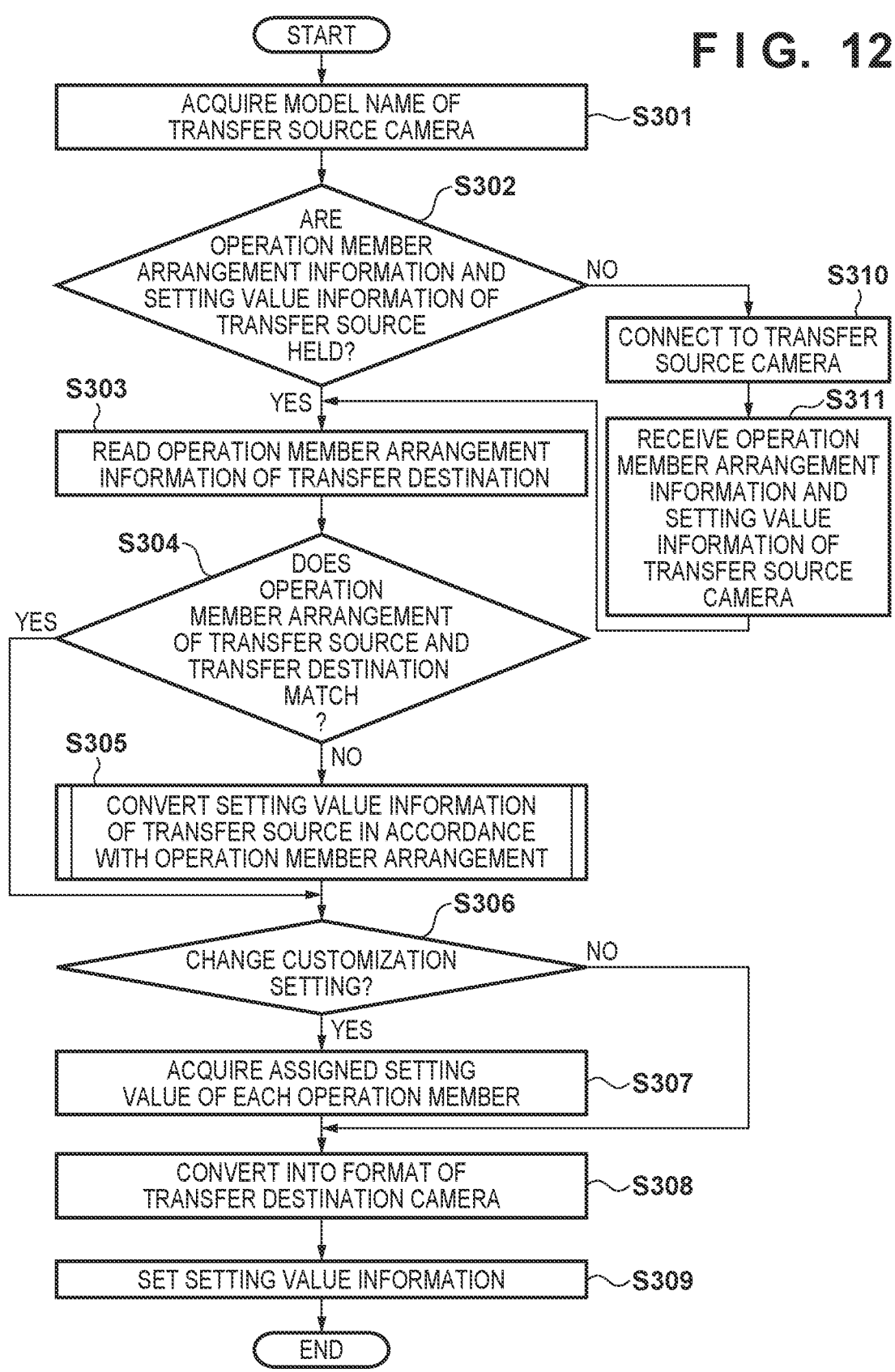
FIG. 12 is a flowchart illustrating a processing procedure of transferring user setting value information according to the third embodiment.

In the third embodiment, an example will be described with reference to the flowchart of FIG. 12 in which the user setting value information of the transfer source camera 200 is reflected in the camera 100 under the initiative of the transfer destination camera 100.

In S301, the system control unit 50 of the transfer destination camera 100 acquires the model name of the transfer source camera 200. The model name may be acquired by accepting an input from the user through the operation unit 70 such as the touch panel 70a, or may be received from the camera 200 via the communication unit 54.

In S302, the system control unit 50 determines whether the operation member arrangement information and the setting value information of the transfer source camera 200 are already being held. The determination is performed by checking whether these pieces of information are stored in a data holding unit of the camera 100 such as the system memory 52, the non-volatile memory 56, or the storage medium 185. Upon determining that both the operation member arrangement information and the setting value information of the transfer source camera are being held, the system control unit 50 advances the process to S303, or to S310 upon determining otherwise.

In S310, the system control unit 50 establishes communication with the transfer source camera 200 using the communication unit 54. The cameras 100 and 200 may be connected either in a wired or a wireless manner, and the communication protocol may be either wired or wireless.

In S311, the system control unit 50 requests the operation member arrangement information and the user setting value information of the transfer source camera 200 via the communication unit 54 to receive these pieces of information. The information to be received is expected to be both the operation member arrangement information and the user setting value information, but supplemental information to either one may also be received.

In S303, the system control unit 50 reads the operation member arrangement information of the transfer destination camera 100 saved in the non-volatile memory 56.

Subsequently, in S304, the system control unit 50 compares the operation member arrangement information of the transfer source camera 200 with that of the camera 100 read out from the non-volatile memory 56 to determine whether the two pieces of information match. When the determination result indicates a match, the system control unit 50 advances the process to S306, or to S305 when the determination result indicates a mismatch.

In S305, the system control unit 50 calls a subroutine for converting the user setting value information of the transfer source camera 200 illustrated in FIG. 8. The processing in S305 has been described in the first embodiment, and thus detailed description thereof is omitted here. Note that since the process illustrated in FIG. 8 is performed by the transfer destination camera 100 in the third embodiment, the resources used when performing the process according to FIG. 8 are naturally those belonging to the camera 100. After execution of the subroutine, the system control unit 50 advances the process to S306.

In S306 the system control unit 50 displays, based on the user setting value information of the transfer destination camera 100, information indicating a correspondence relation between an operation member and an assigned function on the display unit 28 or the like, inquires whether to correct the information, and waits for an input from the user. The user is expected to operate the operation unit 70, for example, and select whether or not to perform correction. Subsequently, upon determining that there has been an input from the user instructing correction, the system control unit 50 advances the process to S307, or to S308 when there has been an instruction not to perform correction.

In S307, the system control unit 50 changes the user setting value information by acquiring from the user what to correct with respect to the setting value information to be assigned to the operation member.

In S308, the system control unit 50 converts the user setting value information of the transfer destination into a data format conforming to the camera 100. The conversion is performed when necessary, and need not be performed when the user setting value information generated through the aforementioned process is already in a format corresponding to the camera 100.

Subsequently, in S309, the system control unit 50 sets up the converted setting value information in the operation member of the camera 100, and terminates the process.

As has been described above, the third embodiment allows for reflecting, in a system including two cameras, the user setting value information of one of the cameras to the other camera.

Although the embodiments according to the present invention described above have taken cameras as examples of transfer source and destination electronic devices, the present invention is not limited thereto. In summary, the present invention can be applied to any electronic device that allows customization of operation members thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-071836, filed Apr. 25, 2022 which is hereby incorporated by reference herein in its entirety.

What is claimed is:

1. An information processing apparatus, comprising:
a first acquisition unit configured to acquire first operation member arrangement information related to an arrangement of an operation member of a first electronic device having an operation member to which a user-set function is assignable, and first setting value information representing a relation between the operation member and the user-set function;
a second acquisition unit configured to acquire second operation member arrangement information related to an arrangement of an operation member of a second electronic device of a different type than the first electronic device;
a conversion unit configured to convert the first setting value information acquired by the first acquisition unit into second setting value information for the second electronic device, based on the first operation member arrangement information acquired by the first acquisition unit and the second operation member arrangement information acquired by the second acquisition unit; and
a transmission unit configured to transmit the second setting value information acquired through the conversion performed by the conversion unit to the second electronic device.

2. The apparatus according to claim 1, wherein
the first operation member arrangement information and the second operation member arrangement information each have identification information for identifying an operation member, and position information indicating a position of a corresponding operation member, and
the first setting value information and the second setting value information each have identification information for identifying an operation member, and information for identifying a function assigned to a corresponding operation member.

3. The apparatus according to claim 1, wherein
the conversion unit:
assigns, when a distance between a position indicated by position information of an operation member described in the first setting value information obtained by the first acquisition unit and a position indicated by position information of a corresponding operation member in the second operation member arrangement information acquired by the second acquisition unit is smaller than or equal to a predetermined threshold value, a function described in the first setting value information acquired by the first acquisition unit to the corresponding operation member; and performs, when the distance between the position indicated by the position information of the operation member described in the first setting value information obtained by the first acquisition unit and the position indicated by the position information of the corresponding operation member in the second operation member arrangement information acquired by the second acquisition unit is greater than the predetermined threshold value, conversion to the second setting value information for the second electronic device by assigning a function to the operation member of the second electronic device, in accordance with an instruction from a user.

4. The apparatus according to claim 3, wherein
the second operation member arrangement information includes information for identifying a surface of an electronic device on which an operation member is provided, and
the conversion unit determines that the distance is greater than a predetermined threshold value and performs conversion into the second setting value information for the second electronic device, when a surface on which an operation member of the first electronic device is provided is different from a surface on which a corresponding operation member of the second electronic device is provided.

5. The apparatus according to claim 1, wherein
the first acquisition unit acquires the first operation member arrangement information and the first setting value information through communication with the first electronic device,
the second acquisition unit acquires the second operation member arrangement information through communication with the second electronic device, and
the transmission unit transmits, to the second electronic device, the second setting value information acquired by the conversion unit through communication with the second electronic device.

6. The apparatus according to claim 1, wherein
the information processing apparatus is a server in a network,
the first acquisition unit acquires the first operation member arrangement information and the first setting value information from the first electronic device relayed through a communication apparatus communicating with the first electronic device and the second electronic device,
the second acquisition unit acquires the second operation member arrangement information from the second electronic device relayed through the communication apparatus, and
the transmission unit transmits the second setting value information acquired by the conversion unit to the second electronic device relayed through the communication apparatus.

7. The apparatus according to claim 1, wherein
the information processing apparatus is the second electronic device, and the first acquisition unit acquires the first operation member arrangement information and the first setting value information through communication with the first electronic device.

8. A method of controlling an information processing apparatus, comprising:
(a) acquiring first operation member arrangement information related to an arrangement of an operation member of a first electronic device having an operation member to which a user-set function is assignable, and first setting value information representing a relation between the operation member and the user-set function;
(b) acquiring second operation member arrangement information related to an arrangement of an operation member of a second electronic device of a different type than the first electronic device;
(c) converting the first setting value information acquired in the acquiring (a) into second setting value information for the second electronic device, based on the first operation member arrangement information acquired in the acquiring (a) and the second operation member arrangement information acquired in the acquiring (b); and
(d) transmitting the second setting value information acquired through the conversion performed in the converting (c) to the second electronic device.

9. A non-transitory computer-readable storage medium storing instructions which, when read and executed by a computer, causes the computer to perform the steps of a method of controlling an information processing apparatus, the method comprising:
(a) acquiring first operation member arrangement information related to an arrangement of an operation member of a first electronic device having an operation member to which a user-set function is assignable, and first setting value information representing a relation between the operation member and the user-set function;
(b) acquiring second operation member arrangement information related to an arrangement of an operation member of a second electronic device of a different type than the first electronic device;
(c) converting the first setting value information acquired in the acquiring (a) into second setting value information for the second electronic device, based on the first operation member arrangement information acquired in the acquiring (a) and the second operation member arrangement information acquired in the acquiring (b); and
(d) transmitting the second setting value information acquired through the conversion performed in the converting (c) to the second electronic device.

* * * * *